US012770150B2

(12) United States Patent
Singh et al.

(10) Patent No.: US 12,770,150 B2
(45) Date of Patent: Oct. 20, 2026

(54) METHOD AND SYSTEM FOR FRAUD PREVENTION

(71) Applicant: MASTERCARD INTERNATIONAL INCORPORATED, Purchase, NY (US)

(72) Inventors: Sachin Kumar Singh, Pune (IN); Kaushal Shetty, O'Fallon, MO (US); Mayank Joshi, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 19/015,609

(22) Filed: Jan. 9, 2025

(65) Prior Publication Data

US 2026/0195759 A1 Jul. 9, 2026

(51) Int. Cl.
*G06Q 20/40* (2012.01)

(52) U.S. Cl.
CPC ................................ *G06Q 20/4016* (2013.01)

(58) Field of Classification Search
CPC .................................................. G06Q 20/4016
See application file for complete search history.

(56) References Cited

U.S. PATENT DOCUMENTS

| | | | | |
|---|---|---|---|---|
| 11,080,379 | B2 | 8/2021 | Li et al. | |
| 12,130,937 | B1 * | 10/2024 | Fakhraie ............ | G06Q 30/0609 |
| 2019/0295088 | A1 * | 9/2019 | Jia ............................ | G06N 5/04 |
| 2022/0207518 | A1 * | 6/2022 | Akashika ............. | G06Q 20/385 |
| 2023/0244741 | A1 * | 8/2023 | Bajaj .................. | G06Q 30/0202 705/27.1 |
| 2024/0362309 | A1 * | 10/2024 | Chakraborty ........... | G06F 21/32 |

* cited by examiner

*Primary Examiner* — Scott C Anderson
(74) *Attorney, Agent, or Firm* — Barta Jones, PLLC

(57) ABSTRACT

A method for facilitating fraud prevention is provided. The method includes detecting registration of access control parameters on a user device of a user. Further, a risk score associated with the user device is obtained based on user device features upon the detection of the registration of access control parameters. Payment activities are restricted on the user device for a predefined time period based on the risk score exceeding a threshold risk score. Additionally, non-payment activities remain accessible on the user device during the predefined time period. As a result, fraudulent payment transactions are prevented in case of takeover of the user device by a fraudulent user.

18 Claims, 9 Drawing Sheets

200A

200B

METHOD AND SYSTEM FOR FRAUD PREVENTION

FIELD

Various embodiments of the present disclosure relate generally to fraud prevention. More particularly, various embodiments of the present disclosure relate to fraud prevention in case of takeover of electronic devices.

BACKGROUND

The rapid technological advancements in the field of financial transactions and electronic devices have led to the introduction of payment transactions on the electronic devices thereby allowing users to electronically transfer funds in real-time without the need for physical cash. Additionally, an electronic device of a user may be equipped with authentication methods that involve authentication parameters (e.g., biometric templates, passwords, or the like) associated with the user to prevent unauthorized access to the electronic device. However, fraudsters constantly find ways to bypass the defence of the electronic devices and get unauthorized access to the electronic devices. Further, upon getting the unauthorized access, such fraudsters perform fraudulent payment transactions by way of the electronic devices.

In light of the foregoing, there is a need for a technical solution that solves the abovementioned problems.

SUMMARY

Methods and systems for facilitating fraud prevention in case of device takeover are provided substantially as shown in and described in connection with, at least one of the figures, as set forth more completely in the claims.

In an embodiment of the present disclosure, a method for facilitating fraud prevention is provided. The method includes detecting, by processing circuitry of a user device, registration of one or more access control parameters on the user device. Further, the method includes obtaining, by the processing circuitry, a risk score associated with the user device upon the detection of the registration of the one or more access control parameters on the user device. The method further includes restricting, by the processing circuitry, one or more payment activities on a set of applications installed on the user device for a first time period based on the risk score exceeding a threshold risk score.

In some embodiments, one or more non-payment activities remain accessible on the set of applications during the first time period.

In another embodiment, a device for facilitating fraud prevention is provided. The device includes processing circuitry configured to detect registration of one or more access control parameters on the device. Further, the processing circuitry is configured to obtain a risk score associated with the device upon the detection of the registration of the one or more access control parameters on the device. The processing circuitry is further configured to restrict one or more payment activities on a set of applications installed on the user device for a first time period based on the risk score exceeding a threshold risk score.

In some embodiments, the method further includes rendering, by the processing circuitry, a time configuration option to a user of the user device to set the first time period for restricting the one or more payment activities on the set of applications. Further, the method includes configuring, by the processing circuitry, the first time period based on a response received from the user for the time configuration option.

In some embodiments, the method further includes rendering, by the processing circuitry, a selection option to a user on the user device to select the set of applications from a plurality of applications installed on the user device for restricting the one or more payment activities on the set of applications.

In some embodiments, the method further includes transmitting, by the processing circuitry, an alert notification to a payment network server indicating to restrict one or more payment transactions associated with the user device during a second time period when one or more payment amounts associated with the one or more payment transactions exceed a threshold payment value.

In some embodiments, the method further includes transmitting, by the processing circuitry, an alert notification to an issuer server indicating to restrict one or more payment transactions associated with the user device during a second time period when one or more payment amounts associated with the one or more payment transactions exceed a threshold payment value.

In some embodiments, the method further includes rendering, by the processing circuitry, an amount configuration option to a user of the user device to set the threshold payment value.

In some embodiments, the method further includes monitoring, by the processing circuitry, a plurality of user device features associated with the user device during a third time period. The method further includes determining, by the processing circuitry, a plurality of user device feature values for the plurality of user device features based on the monitoring. The risk score is obtained based on the plurality of user device feature values.

In some embodiments, the method further includes inputting, by the processing circuitry, the plurality of user device feature values to a trained risk score machine learning model. The risk score is outputted by the trained risk score machine learning model based on the plurality of user device feature values.

In some embodiments, the one or more access control parameters correspond to at least one of a fingerprint template, an iris template, a facial template, a personal identification number, and a passcode.

In some embodiments, the processing circuitry is further configured to render a time configuration option to a user of the device to set the first time period for restricting the one or more payment activities on the set of applications. Further, the processing circuitry is configured to configure the first time period based on a response received from the user for the time configuration option.

In some embodiments, the processing circuitry is further configured to render a selection option to a user on the device to select the set of applications from a plurality of applications installed on the device for restricting the one or more payment activities on the set of applications.

In some embodiments, the processing circuitry is further configured to transmit an alert notification to a payment network server indicating to restrict one or more payment transactions associated with the device during a second time period when one or more payment amounts associated with the one or more payment transactions exceed a threshold payment value.

In some embodiments, the processing circuitry is further configured to transmit an alert notification to an issuer server indicating to restrict one or more payment transactions associated with the device during a second time period when one or more payment amounts associated with the one or more payment transactions exceed a threshold payment value.

In some embodiments, the processing circuitry is further configured to render an amount configuration option to a user of the device to set the threshold payment value.

In some embodiments, the processing circuitry is further configured to monitor a plurality of device features associated with the device during a third time period. Further, the processing circuitry is configured to determine a plurality of device feature values for the plurality of device features based on the monitoring. The risk score is obtained based on the plurality of device feature values.

In some embodiments, the device further comprises a memory coupled to the processing circuitry and configured to store a trained risk score machine learning model. The processing circuitry is further configured to input the plurality of device feature values to the trained risk score machine learning model. The risk score is outputted by the trained risk score machine learning model based on the plurality of device feature values.

BRIEF DESCRIPTION OF THE DRAWINGS

The accompanying drawings illustrate the various embodiments of systems, methods, and other aspects of the disclosure. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the present disclosure are illustrated by way of example, and not limited by the appended figures, in which like references indicate similar elements.

Figure 1:
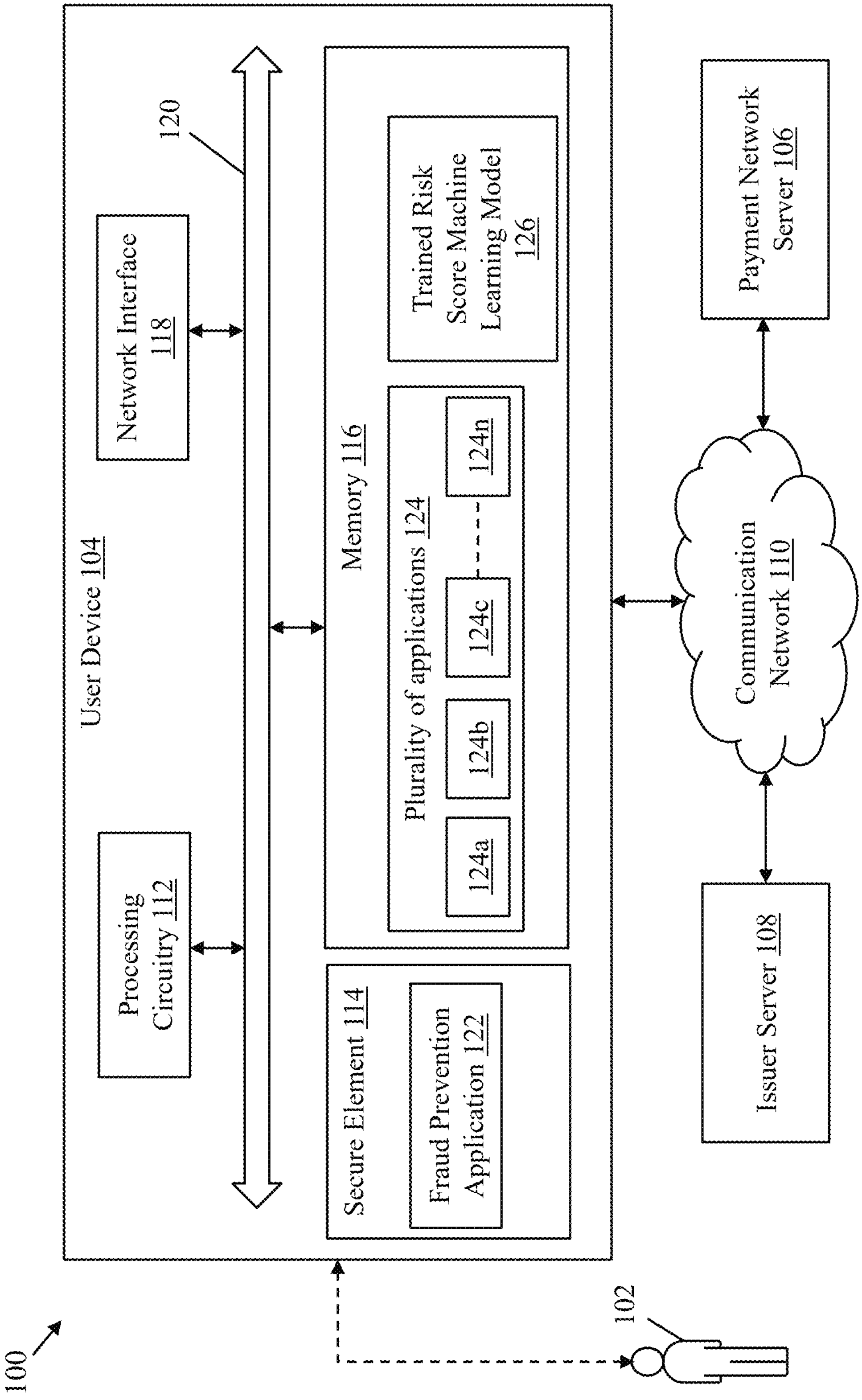
FIG. 1 is a block diagram that illustrates a system environment, in accordance with an exemplary embodiment of the present disclosure.

Further areas of applicability of the present disclosure will become apparent from the detailed description provided hereinafter. It should be understood that the detailed description of exemplary embodiments is intended for illustration purposes only and is, therefore, not intended to necessarily limit the scope of the present disclosure.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Overview

Electronic devices are equipped with authentication methods such as biometric authentication to prevent unauthorized access to the electronic devices. However, a fraudster finds ways to bypass the authentication methods and gain unauthorized access to an electronic device of a user. The fraudster further registers a new authentication parameter (e.g., fingerprint template) on the electronic device. Thus, the electronic device is taken over by the fraudster. The fraudster performs payment transactions by way of the electronic device by using the new authentication parameter.

Various embodiments of the present disclosure provide a method and a system that solve the abovementioned problems by facilitating prevention of fraudulent payment transactions in case of device takeover. The method includes detection of registration of one or more new access control parameters on a user device. Further, a risk score associated with the user device is obtained based on various activities performed on the user device in response to the detection. The risk score is indicative of a probability of a potential takeover of the user device. Thus, one or more payment activities are restricted on the user device for a predefined period of time when the risk score exceeds a threshold value. Additionally, one or more non-payment activities remain accessible on the user device. The processing circuitry restricts the one or more payment activities on the user device when the user device is potentially taken over by a fraudster. As a result, fraudulent payment transactions by way of the compromised user device are prevented.

Terms Description (in Addition to Plain and Dictionary Meaning)

User device may refer to a computing device of a user. The user device may be utilized by the user to perform one or more payment activities and one or more non-payment activities.

Access control parameter refers to a security setting or mechanism that governs access to a user device and one or more operations on the user device. The access control parameter is used to ensure that only authorized user can access the user device and the one or more operations on the user device. Examples of the access control parameter may include a fingerprint template, an iris template, a facial template, a personal identification number, a passcode, or the like.

Application is a computer program installed on a user device to perform a specific function or a set of specific functions.

Risk score machine learning model refers to a machine learning model that is realized by one or more ML algorithms that learn patterns from training data to one of classify new data, predict a result based on the new data, or make decisions based on the new data. The risk score machine learning model referred to here predicts a risk score associated with a user device.

Risk score is indicative of a probability of a potential takeover of a user device by a fraudster.

Server is a physical or cloud data processing system on which a server program runs. A server may be implemented in hardware or software, or a combination thereof. In one embodiment, the server is implemented as a computer program that is executed on programmable computers, such as personal computers, laptops, or a network of computer systems. The server may correspond to a payment network server or an issuer server.

Payment networks act as intermediate entities between acquirer banks and issuer banks to authenticate and fund transactions.

Issuer is a financial institution such as a bank where accounts of several users are established and maintained. The issuer ensures payment for approved transactions in accordance with various payment network regulations and local legislation.

FIG. 1 is a block diagram that illustrates a system environment 100, in accordance with an exemplary embodiment of the present disclosure. The system environment 100 may include a user 102, a user device 104, a payment network server 106, an issuer server 108, and a communication network 110. The user device 104, the payment network server 106, and the issuer server 108 may communicate with each other by way of the communication network 110 or through a separate communication network established therebetween. The system environment 100 may facilitate fraud prevention in case of takeover of the user device 104 by a fraudulent user.

The user 102 is an account holder of a user payment account maintained at a financial institution, such as an issuer. Examples of the user payment account may include a savings account, a current account, a debit account, a credit account, a digital wallet account, or the like. Additionally, the user 102 may be associated with one or more payment modes. The user 102 may utilize an associated payment mode to perform one or more payment transactions associated with the user payment account. The one or more payment modes are issued to the user 102 by the financial institution.

A payment transaction refers to transfer of funds from one payment account to another payment account. A payment mode may be utilized to perform the payment transaction. Examples of the payment mode may include but are not limited to, a payment card, a digital wallet, a virtual payment address (VPA), or the like. A payment card may be either a physical payment card or a virtual payment card. Examples of the payment card include, but are not limited to, a credit card, a debit card, a prepaid card, a gift card, a rewards card, a loyalty points card, a frequent flyer miles card, or the like.

A digital wallet is a financial instrument that facilitates payment transactions. The digital wallet is preloaded with funds. The funds available in the digital wallet is used for payment transactions. Additionally, the funds may be added to the digital wallet from the corresponding payment account. VPA is a unique identifier used for payment transactions. The VPA serves as an alternative to sharing sensitive bank account details (such as the account number and Indian Financial System Code (IFSC) code) during payment transactions.

The user device 104 may refer to a computing device of the user 102. The user device 104 may be utilized by the user 102 to perform one or more payment activities and one or more non-payment activities. Examples of the one or more payment activities may include mobile wallet payments, in-app purchases, online shopping payments, bill payments, quick response (QR) code payments, banking application transfers, or the like. Examples of the one or more non-payment activities may include scrolling through online shopping applications, adding items to a cart on online shopping applications, playing games, reading blogs and news, watching videos, or the like. Examples of the user device 104 may include a mobile phone, a laptop, a smartphone, a tablet, a phablet, a wearable device such as a smartwatch, or the like.

The user device 104 may include processing circuitry 112, a secure element 114, a memory 116, and a network interface 118. The processing circuitry 112, the secure element 114, the memory 116, and the network interface 118 may be communicatively coupled to each other by way of a communication bus 120. Additionally, a fraud prevention application 122 may be installed on the user device 104. The fraud prevention application 122 may be provided by the payment network server 106. In some embodiments, the fraud prevention application 122 may be installed on the user device 104 during manufacturing of the user device 104. In further embodiments, the fraud prevention application 122 may be installed on the user device 104 by the user 102 after purchasing the user device 104. Additionally, a plurality of applications 124 that includes a first application 124*a*, a second application 124*b*, a third application 124*c*, . . . , and an nth application 124*n*, may be installed on the user device 104. An application is a computer program installed on the user device 104 to perform a set of specific functions. Examples of the plurality of applications may include payment applications, online banking applications, video editing applications, gaming applications, online shopping applications, video streaming applications, web browsing applications, and the like. The user 102 may perform the one or more payment activities and the one or more non-payment activities through one or more applications of the plurality of applications 124.

The processing circuitry 112 may include suitable logic, circuitry, interfaces, and/or code, executable by the circuitry that may be configured to perform one or more operations for facilitating fraud prevention in the user device 104. The processing circuitry 112 may be configured to execute a set of instructions associated with the fraud prevention application 122 to facilitate fraud prevention in the user device 104. Examples of the processing circuitry 112 may include but are not limited to, an application-specific integrated circuit (ASIC) processor, a reduced instruction set computer (RISC) processor, a complex instruction set computer (CISC) processor, a field programmable gate array (FPGA), a central processing unit (CPU), or the like.

Upon purchasing the user device 104, a set of access control parameters may be registered on the user device 104 by the user 102. An access control parameter refers to a security setting or mechanism that governs access to the user device 104 and one or more operations on the user device 104. The access control parameter is used to ensure that only authorized user can access the user device 104 and the one or more operations on the user device 104. Examples of the access control parameter may include a fingerprint template, an iris template, a facial template, a personal identification number, a passcode, or the like.

A fingerprint template refers to a digital representation of a fingerprint of an individual (e.g., the user 102) that is used for biometric identification or verification. The fingerprint template of the user 102 may be registered on the user device 104 by scanning a fingerprint of the user 102 by way of a fingerprint sensor (not shown) of the user device 104. The processing circuitry 112 may be configured to create the fingerprint template through specialized algorithms that extract unique features of the fingerprint and encode the unique features into a smaller, fixed-size format that can be stored in the user device 104. An iris template refers to a digital representation of unique patterns found in an iris of an eye of an individual (e.g., the user 102) that is used for biometric identification or verification. The iris template of the user 102 may be registered on the user device 104 by scanning an iris of the user 102 by way of an iris sensor (not shown) of the user device 104. The processing circuitry 112 may be configured to create the iris template by applying image processing and feature extraction algorithms on the scanned iris of the user 102.

A facial template refers to a digital representation of facial features of an individual, derived from a facial image or video that is used for biometric identification or verification. The facial template may be registered on the user device 104 by capturing a facial image or video of the user 102 by way of a camera (not shown) of the user device 104. The processing circuitry 112 may create the facial template of the user 102 by extracting key facial characteristics such as the distance between eyes, nose shape, cheekbones, and the overall structure of the face, using advanced image processing techniques or deep learning algorithms on the captured facial image or video. A personal identification number refers to a numeric code that is used to authenticate an identity of an individual (e.g., the user 102). A passcode refers to a security code that is used to verify an identity of an individual (e.g., the user 102) and grant access to a device, an application, or an account. A passcode typically consists of a series of numbers, letters, or a combination of numbers and letters. The processing circuitry 112 may store the set of access control parameters in the secure element 114.

The processing circuitry 112 may be further configured to render a selection option to the user 102 on the user device 104 to select a set of applications from the plurality of applications for restricting the one or more payment activities on the set of applications for a first time period. The selection option may indicate the user 102 to select the set of applications in which the user 102 may desire to restrict the one or more payment activities in case of detection of any suspicious activities on the user device 104. In response, the set of applications may be selected by the user 102. In an example, the set of applications may include the online banking applications, the online shopping applications, the gaming applications, the video streaming applications, the digital wallet applications, payment applications, food delivery applications, grocery delivery applications, the web browsing applications, and the like.

In some embodiments, the first time period may be pre-determined by the payment network server 106. In further embodiments, the processing circuitry 112 may be further configured to render a time configuration option to the user 102 on the user device 104 to set the first time period for restricting the one or more payment activities on the set of applications. The processing circuitry 112 may receive a response from the user 102 for the time configuration option. In an example, the first time period is one hour. In another example, the first time period is two hours. In yet another example, the first time period is four hours. The processing circuitry 112 may further configure the first time period based on the response received from the user 102 for the time configuration option. Additionally, the processing circuitry 112 may be configured to render an amount configuration option to the user 102 on the user device 104 to set a threshold payment value. The amount configuration option may indicate the user 102 to set the threshold payment value, where one or more payment transactions that are associated with one or more payment amounts, performed by way of the user device 104 may be restricted for a second time period when the one or more payment amounts exceed the threshold payment value. In some embodiments, the first time period and the second time period may be mutually inclusive. In some additional embodiments, the first time period and the second time period may be mutually exclusive. In an example, the second time period may be five hours. In an example, the second time period may be set by the user 102. In another example, the second time period may be predefined by the payment network server 106.

The processing circuitry 112 may be configured to monitor a plurality of user device features associated with the user device 104 based on the selection of the set of applications, the configuration of the first time period, and the setting of the threshold payment value. The plurality of user device features may include a plurality of non-invasive device features and a plurality of consent-based device features. The plurality of non-invasive device features may include a battery-level of the user device 104, a charging status of the user device 104, usage statistics of the plurality of applications, network connectivity of the user device 104, an orientation of the user device 104, or the like. The plurality of consent-based device features may include a location of the user device 104, a model number of the user device 104, a manufacturer of the user device 104, a unique device identifier of the user device 104, data transfer details (e.g., transfer of photos, documents, videos, and the like) of the user device 104, or the like. The processing circuitry 112 may request consent of the user 102 and monitor the plurality of consent-based device features after receiving the consent of the user 102.

The processing circuitry 112 may be further configured to detect registration of one or more access control parameters on the user device 104. In an example, the processing circuitry 112 may detect the registration of a fingerprint template on the user device 104. In a scenario, the user device 104 may be taken over by a fraudulent user from the user 102 and the fingerprint template of the fraudulent user is registered on the user device 104 by the fraudulent user.

The processing circuitry 112 may be further configured to determine a plurality of user device feature values for the plurality of user device features based on the monitoring of the user device 104 for a third time period. In other words, the processing circuitry 112 determines the plurality of user device feature values based on the monitoring performed in the third time period. In an example, the processing circuitry 112 may determine that the battery-level of the user device 104 is 40%, the charging status of the user device 104 is "not charging", the network connectivity of the user device 104 is "connected to hotspot", and the like. In some embodiments, the third time period may include a time period prior to the detection of the registration of the one or more access control parameters on the user device 104. In an example, the third time period may include two hours prior to the detection of the registration of the one or more access control parameters. In some additional embodiments, the third time period may include a time period prior to the detection of the registration of the one or more access control parameters on the user device 104 and a time period after the detection of the registration of the one or more access control parameters on the user device 104. In an example, the third time period may include two hours prior to and five minutes after the detection of the registration of the one or more access control parameters on the user device 104.

The processing circuitry 112 may be further configured to input the plurality of user device feature values to a trained risk score machine learning model 126. The trained risk score machine learning model 126 may be associated with the fraud prevention application 122. Additionally, the trained risk score machine learning model 126 may be stored in the memory 116 during the installation of the fraud prevention application 122. The processing circuitry 112 may be further configured to obtain a risk score associated with the user device 104 from the trained risk score machine learning model 126. The risk score is outputted by the trained risk score machine learning model 126 based on the plurality of user device feature values. In other words, the processing circuitry 112 may obtain the risk score associated with the user device 104 based on the plurality of user device feature values upon the detection of the registration of the one or more access control parameters on the user device 104. The risk score may be indicative of a potential risk associated with the user device 104. In other words, the risk score may indicate a probability of a potential takeover of the user device 104 by a fraudulent user. In an example, the risk score may indicate a higher probability of a potential takeover of the user device 104 by a fraudulent user when the plurality of user device feature values indicate that a usage pattern of the user device 104 deviates largely from a regular usage pattern.

The processing circuitry 112 may be further configured to restrict the one or more payment activities (e.g., mobile wallet payments, in-app purchases, online shopping payments, bill payments, quick response (QR) code payments, banking application transfers, or the like) on the set of applications for the first time period (e.g., two hours) based on the risk score exceeding a threshold risk score. In an example, the threshold risk score is 0.7. In such an example, the processing circuitry 112 restricts the one or more payment activities on the set of applications for the first time period when the risk score is above 0.7. Additionally, the one or more non-payment activities (e.g., scrolling through online shopping applications, adding items to a cart on online shopping applications, playing games, watching videos, or the like) may remain accessible on the set of applications during the first time period. As a result, fraudulent payment transactions by way of the user device 104 are prevented when the user device 104 is taken over by a fraudulent user. As the restriction is on the one or more payment activities, the user 102 may perform the one or more non-payment activities when a determination of the potential takeover of the user device 104 is a false positive. The processing circuitry 112 may withdraw the restriction on the one or more payment activities after completion of the first time period.

In additional embodiments, the processing circuitry 112 may be further configured to transmit an alert notification to the payment network server 106. The alert notification indicates the payment network server 106 to restrict one or more payment transactions associated with the user device 104 during the second time period when one or more payment amounts associated with the one or more payment transactions exceed the threshold payment value. As a result, the alert notification may include the indication, the unique device identifier of the user device 104, and the threshold payment value.

In further additional embodiments, the processing circuitry 112 may be further configured to transmit the alert notification to the issuer server 108. The alert notification indicates the issuer server 108 to restrict one or more payment transactions associated with the user device 104 during the second time period when one or more payment amounts associated with the one or more payment transactions exceed the threshold payment value. As a result, the alert notification may include the indication, the unique device identifier of the user device 104, and the threshold payment value.

In some embodiments, the processing circuitry 112 may be further configured to render a prompt on the user device 104 upon activation of the restriction on the one or more payment activities on the set of applications. The prompt may be indicative of inputting a primary access control parameter. The primary access control parameter refers to an access control parameter of the set of access control parameters that was registered first on the user device 104 or set as the primary access control parameter by the user 102. The processing circuitry 112 may withdraw the restriction on the one or more payment activities on the set of applications based on receiving the primary access control parameter.

In further additional embodiments, the processing circuitry 112 may be further configured to render a prompt on the user device 104 after completion of the second time period. The prompt may be indicative of inputting the primary access control parameter. The processing circuitry 112 may transmit a clearance notification to at least one of the payment network server 106 and the issuer server 108 upon receiving the primary access control parameter in response to the prompt. The clearance notification indicates that the restriction on the one or more payment transactions associated with the user device 104 may be withdrawn. The processing circuitry 112 may transmit a warning notification to at least one of the payment network server 106 and the issuer server 108 in the absence of receiving the primary access control parameter in response to the prompt. The warning notification may be indicative of continued threat with the one or more payment transactions associated with the user device 104.

Although it is described that the set of applications is selected by the user 102, the scope of the present disclosure is not limited to it. In additional embodiments, the processing circuitry 112 may be configured to select the set of applications from the plurality of applications upon the installation of the fraud prevention application 122 on the user device 104.

The secure element 114 may include suitable logic, circuitry, and/or interfaces to store the set of access control parameters, the fraud prevention application 122, various sensitive data, or the like to facilitate fraud prevention in the user device 104. For example, the secure element 114 may be configured to store the set of access control parameters upon the registration of the set of access control parameters on the user device 104. Additionally, the secure element 114 may be configured to store the set of instructions associated with the fraud prevention application 122 upon the installation of the fraud prevention application 122 on the user device 104. The secure element 114 refers to a tamper-resistant hardware component that is designed to securely store sensitive data.

The memory 116 may include suitable logic, circuitry, and/or interfaces to store various instructions, tables, machine learning models, or the like to facilitate fraud prevention. For example, the memory 116 may store the plurality of applications 124 and the trained risk score machine learning model 126. The memory 116 may be configured to store a corresponding set of instructions associated with each application of the plurality of applications. Examples of the memory 116 may include a random-access memory (RAM), a read-only memory (ROM), a programmable ROM (PROM), an erasable PROM (EPROM), a removable storage device, a hard disk drive (HDD), a flash memory, a solid-state memory, or the like.

The network interface 118 may include suitable logic, circuitry, interfaces, and/or code, executable, by the circuitry, to transmit and receive data over the communication network 110 using one or more communication network protocols. Examples of the network interface 118 may include but are not limited to, an antenna, a radio frequency trans receiver, an ethernet port, a USB port, or any other device confirmed to transmit and receive data.

The payment network server 106 is a server arrangement that includes suitable logic, circuitry, interface, and/or code, executable by the circuitry to facilitate fraud prevention. The payment network server 106 may provide the fraud prevention application 122. Additionally, the payment network server 106 may be configured to train a risk score machine learning model to obtain the trained risk score machine learning model 126. Additionally, the payment network server 106 may provide the trained risk score machine learning model 126 to the user device 104 as a part of the fraud prevention application 122. A machine learning model refers to a model that is realized by one or more machine learning algorithms that learn patterns from training data to one of classify new data, predict a result based on the new data, or make decisions based on the new data. Examples of a machine learning algorithm may include but are not limited to, K-means clustering, hierarchical clustering, decision trees, neural networks, linear regression, Random Forest, support vector machines, or the like.

The payment network server 106 may be configured to perform a plurality of operations to obtain the trained risk score machine learning model 126. The plurality of operations may include data preprocessing, model selection, model training, and model evaluation. The data preprocessing may include feature engineering, normalization of numerical features, and handling of missing values to prepare data required for obtaining the trained risk score machine learning model 126. The model selection refers to selection of one or more machine learning algorithms to realize the risk score machine learning model. In an example, supervised learning algorithms such as logistic regression models or Random Forest, and one-class support vector machine may be selected. The one-class support vector machine facilitates anomaly detection. The model training may include splitting of the pre-processed data into training dataset and testing dataset, training the risk score machine learning model based on the training dataset, testing the trained risk score machine learning model 126 based on the testing dataset, and using cross validation to prevent overfitting. Further, the model evaluation includes evaluation of the trained risk score machine learning model 126 based on metrics such as accuracy, precision, recall, and F1 score. Thus, the trained risk score machine learning model 126 is obtained by the payment network server 106.

In some embodiments, the payment network server 106 may receive the alert notification from the user device 104. The alert notification may indicate the payment network server 106 to restrict the one or more payment transactions associated with the user device 104 during the second time period when the one or more payment amounts associated with the one or more payment transactions exceed the threshold payment value. In an example, the second time period is six hours and the threshold payment value is 100$. In such an example, the payment network server 106 may reject a payment transaction initiated from the user device 104 during the second time period when a payment amount associated with the payment transaction exceeds 100$. Thus, fraudulent payment transactions initiated by way of the user device 104 that is taken over by the fraudulent user are prevented.

The issuer server 108 is a server arrangement that includes suitable logic, circuitry, interface, and/or code, executable by the circuitry for facilitating the electronic transactions. The issuer server 108 is operated by the issuer of the user payment account of the user 102. In some further embodiments, the issuer server 108 may be configured to receive the alert notification from the user device 104. The alert notification may indicate the issuer server 108 to restrict the one or more payment transactions associated with the user device 104 during the second time period when the one or more payment amounts associated with the one or more payment transactions exceed the threshold payment value. As a result, the issuer server 108 may reject one or more payment transactions associated with the user device 104 during the second time period when the one or more payment amounts associated with the one or more payment transactions exceed the threshold payment value.

Examples of the payment network server 106 and the issuer server 108 may include, but are not limited to computers, laptops, mini-computers, mainframe computers, any non-transient and tangible machines that may execute a machine-readable code, cloud-based servers, distributed server networks, network of computer systems, or a combination thereof.

The communication network 110 may be a medium through which content and messages are transmitted between the user device 104, the payment network server 106, and the issuer server 108. Examples of the communication network 110 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the system environment 100 may connect to the communication network 110 in accordance with various wired and wireless communication protocols, such as Transmission Control Protocol and Internet Protocol (TCP/IP), User Datagram Protocol (UDP), Long Term Evolution (LTE) communication protocols, or any combination thereof.

In operation, the set of access control parameters may be registered on the user device 104 by the user 102 upon purchasing the user device 104. In an example, the fingerprint template (e.g., a first fingerprint template) and the iris template, of the user 102 are registered on the user device. Further, the processing circuitry 112 may render the selection option to the user 102 on the user device 104 to select the set of applications from the plurality of applications 124 for restricting the one or more payment activities on the set of applications for the first time period. In response, the set of applications may be selected by the user 102. In an example, the set of applications may include the online banking applications, the online shopping applications, the gaming applications, the video streaming applications, the digital wallet applications, payment applications, food delivery applications, grocery delivery applications, the web browsing applications, and the like.

In some embodiments, the first time period may be pre-determined by the payment network server 106. In further embodiments, the processing circuitry 112 may render the time configuration option to the user 102 on the user device 104 to set the first time period for restricting the one or more payment activities on the set of applications. The processing circuitry 112 may receive a response from the user 102 for the time configuration option. In an example, the first time period is one hour. In another example, the first time period is two hours. The processing circuitry 112 may further configure the first time period based on the response received from the user 102 for the time configuration option. Additionally, the processing circuitry 112 may render the amount configuration option to the user 102 on the user device 104 to set the threshold payment value. The amount configuration option may indicate the user 102 to set the threshold payment value, where the one or more payment transactions that are associated with the one or more payment amounts, performed by way of the user device 104 may be restricted for the second time period when the one or more payment amounts exceed the threshold payment value. In an example, the second time period may be twelve hours.

The processing circuitry 112 may monitor the plurality of user device features associated with the user device 104 based on the selection of the set of applications, the configuration of the first time period, and the setting of the threshold payment value. The plurality of user device features include the plurality of non-invasive device features and the plurality of consent-based device features. The plurality of non-invasive device features include the battery-level of the user device 104, the charging status of the user device 104, the usage statistics of the plurality of applications 124, the network connectivity of the user device 104, the orientation of the user device 104, or the like. The plurality of consent-based device features may include the location of the user device 104, the model number of the user device 104, the manufacturer of the user device 104, the unique device identifier of the user device 104, data transfer details (e.g., transfer of photos, documents, videos, and the like) of the user device 104, or the like. The processing circuitry 112 may request consent of the user 102 and monitor the plurality of consent-based device features after receiving the consent of the user 102.

The processing circuitry 112 may detect the registration of the one or more access control parameters on the user device 104. The one or more access control parameters are registered after the registration of the set of access control parameters. In an example, the processing circuitry 112 may detect the registration of a fingerprint template (e.g., a second fingerprint template) on the user device 104. In a scenario, the user device 104 may be taken over by a fraudulent user from the user 102 and the fingerprint template (e.g., the second fingerprint template) of the fraudulent user is registered on the user device 104 by the fraudulent user.

The processing circuitry 112 may determine the plurality of user device feature values for the plurality of user device features based on the monitoring of the user device 104 in the third time period. In an example, the processing circuitry 112 may determine that the battery-level of the user device 104 is 30%, the charging status of the user device is "not charging", the network connectivity of the user device 104 is "connected to public WiFi", and the like, based on the monitoring of the user device 104 in two hours prior to the detection of the registration of the one or more access control parameters.

The processing circuitry 112 may input the plurality of user device feature values to the trained risk score machine learning model 126 stored in the memory 116. The trained risk score machine learning model 126 stored in the memory 116 outputs the risk score associated with the user device based on the plurality of user device feature values. Thus, the processing circuitry 112 obtains the risk score from the trained risk score machine learning model 126. The risk score may be indicative of a probability of a potential takeover of the user device 104 by a fraudulent user. In an example, the risk score may indicate a higher probability of a potential takeover of the user device 104 by a fraudulent user when the plurality of user device feature values indicate that a usage pattern of the user device 104 deviates largely from a regular usage pattern.

The processing circuitry 112 may restrict the one or more payment activities (e.g., mobile wallet payments, in-app purchases, online shopping payments, bill payments, QR code payments, banking application transfers, or the like) on the set of applications for the first time period (e.g., two hours) based on the risk score exceeding a threshold risk score. In an example, the threshold risk score is 0.8. In such an example, the processing circuitry 112 restricts the one or more payment activities on the set of applications for the first time period when the risk score is above 0.8. Additionally, the one or more non-payment activities (e.g., scrolling through online shopping applications, adding items to a cart on online shopping applications, playing games, watching videos, or the like) may remain accessible on the set of applications during the first time period. As a result, fraudulent payment transactions by way of the user device 104 are prevented when the user device 104 is taken over by a fraudulent user.

In additional embodiments, the processing circuitry 112 may transmit the alert notification to the payment network server 106. The alert notification indicates the payment network server 106 to restrict the one or more payment transactions associated with the user device 104 during the second time period when the one or more payment amounts associated with the one or more payment transactions exceed the threshold payment value. As a result, the alert notification may include the indication, the unique device identifier of the user device 104, and the threshold payment value. In an example, the second time period is eight hours and the threshold payment value is 200$. In such an example, the payment network server 106 may reject a payment transaction initiated from the user device 104 during the second time period when a payment amount associated with the payment transaction exceeds 200$. Thus, fraudulent payment transactions initiated by way of the user device 104 that is taken over by the fraudulent user during the second time period are prevented.

In further additional embodiments, the processing circuitry 112 may transmit the alert notification to the issuer server 108. The alert notification indicates the issuer server 108 to restrict the one or more payment transactions associated with the user device 104 during the second time period when the one or more payment amounts associated with the one or more payment transactions exceed the threshold payment value. In an example, the second time period is twelve hours and the threshold payment value is 5000$. In such an example, the issuer server 108 may reject a payment transaction initiated from the user device 104 during the second time period when a payment amount associated with the payment transaction exceeds 5000$. Thus, fraudulent payment transactions initiated by way of the user device 104 that is taken over by the fraudulent user during the second time period are prevented.

Although it is described that the fraud prevention application 122 is provided by the payment network server 106, the scope of the present disclosure is not limited to it. In numerous embodiments, the fraud prevention application 122 may be provided by the issuer server 108 or any third party entity.

Figure 2A:
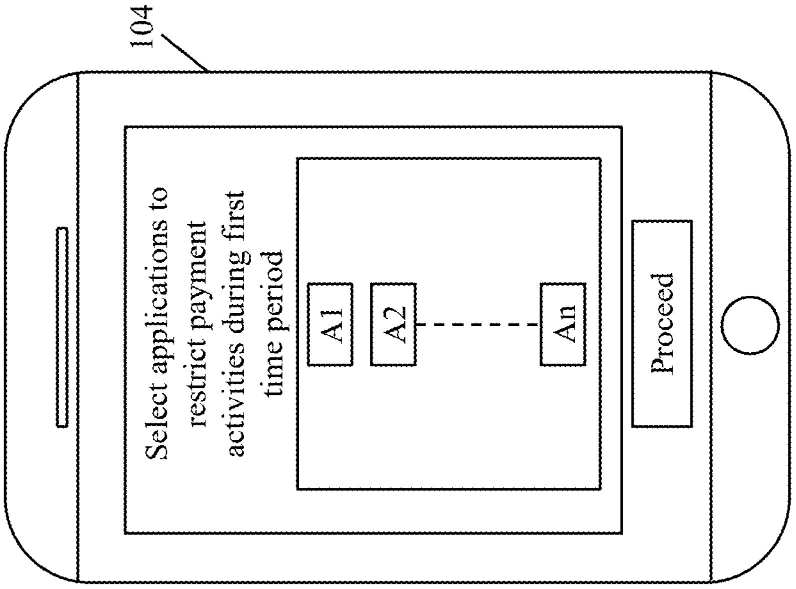
FIG. 2A illustrates a pictorial representation of a selection option rendered on a user device of the system environment of FIG. 1, in accordance with an exemplary embodiment of the disclosure.

FIG. 2A illustrates a pictorial representation 200A of the selection option rendered on the user device 104, in accordance with an exemplary embodiment of the disclosure.

The selection option may be rendered on the user device 104 by the processing circuitry 112 upon instantiation of the fraud prevention application 122 on the user device 104. The selection option indicates "Select applications to restrict payment activities during first time period" to the user 102. The selection option further renders the plurality of applications on the user device 104 that are illustrated as "A1, A2, . . . , and An" in FIG. 2A. Additionally, an option to proceed after selecting the set of applications from the plurality of applications 124 is illustrated as "Proceed" on the user device 104. Thus, the processing circuitry 112 facilitates the user 102 to select the set of applications from the plurality of applications in which the one or more payment activities are desired to be restricted for the first time period in case of the detection of any suspicious activities on the user device 104. In an example, the set of applications may include the online banking application, the online shopping application, the gaming application, the video streaming application, the digital wallet application, the payment application, the food delivery application, the grocery delivery application, the web browsing application, and the like. The set of applications may be selected by the user 102 by way of one or more input devices (not shown) of the user device 104. Examples of the one or more input devices may include a touchscreen, a keypad, a mouse, or the like.

Figure 2B:
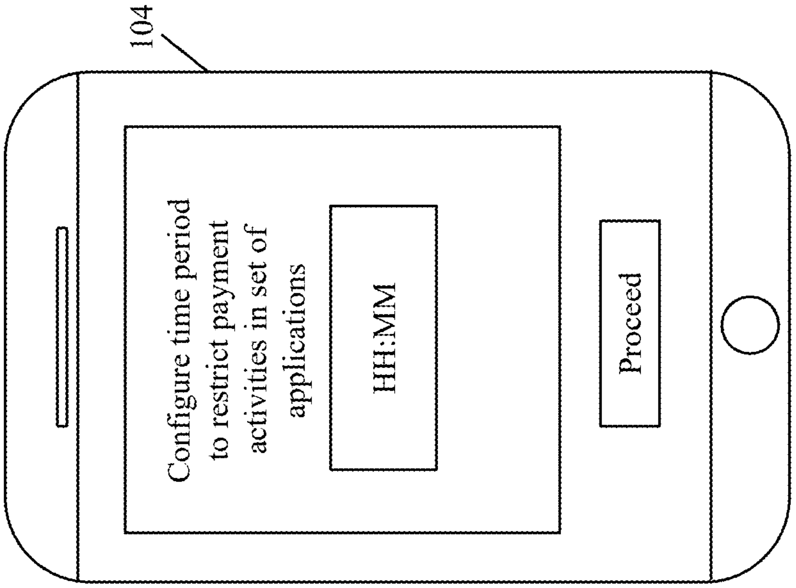
FIG. 2B illustrates a pictorial representation of a time configuration option rendered on the user device of the system environment of FIG. 1, in accordance with an exemplary embodiment of the disclosure.

FIG. 2B illustrates a pictorial representation 200B of the time configuration option rendered on the user device 104, in accordance with an exemplary embodiment of the disclosure.

The time configuration option rendered on the user device 104 enables the user 102 to set the first time period for restricting the one or more payment activities on the set of applications. The time configuration option indicates "Configure time period to restrict payment activities on set of applications". Further, an option to set the time period is provided as "HH:MM", where "HH" corresponds to hours and "MM" corresponds to minutes. Additionally, an option to proceed with the set time period is illustrated as "Proceed". In an example, "HH:MM" may be set as "01:00". In another example, "HH:MM" may be set as "02:30". The first time period may be set by the user 102 by way of the one or more input devices (not shown) of the user device 104. Further, the processing circuitry 112 configures the first time period based on the response received from the user 102.

Figure 2C:
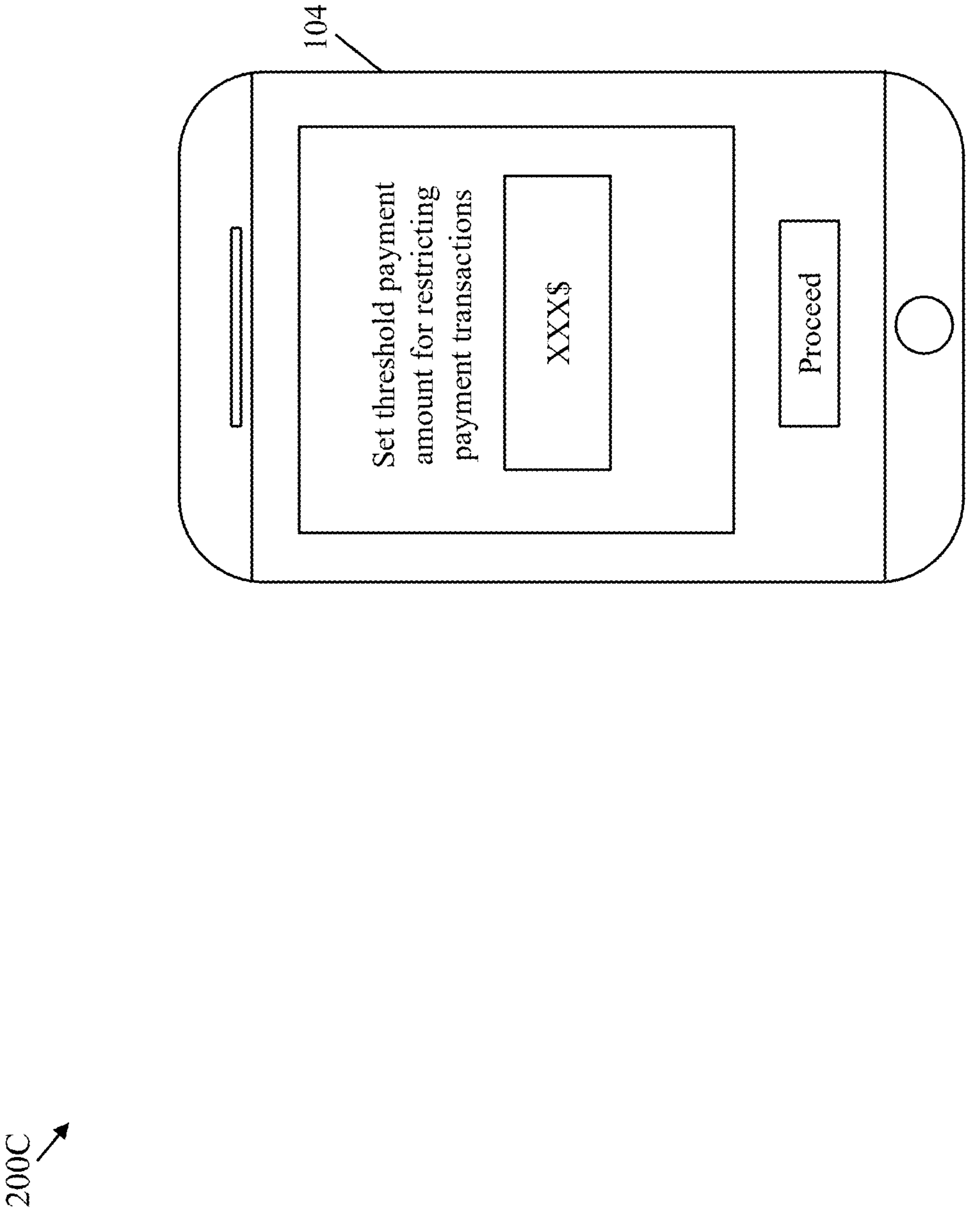
FIG. 2C illustrates a pictorial representation of an amount configuration option rendered on the user device of the system environment of FIG. 1, in accordance with an exemplary embodiment of the disclosure.

FIG. 2C illustrates a pictorial representation 200C of the amount configuration option rendered on the user device 104, in accordance with an exemplary embodiment of the disclosure.

The amount configuration option rendered on the user device 104 enables the user 102 to set the threshold payment amount. The amount configuration option indicates "Set threshold payment value for restricting payment transactions". In response, the amount illustrated as "XXX" may be set by the user 102. In an example, "XXX" may correspond to "100$". Additionally, an option to proceed with the set threshold payment value is illustrated as "Proceed" on the user device 104. Thus, the threshold payment value where the one or more payment transactions associated with the one or more payment amounts, performed by way of the user device 104 may be restricted for the second time period, when the one or more payment amounts exceed the threshold payment amount.

Figure 3:
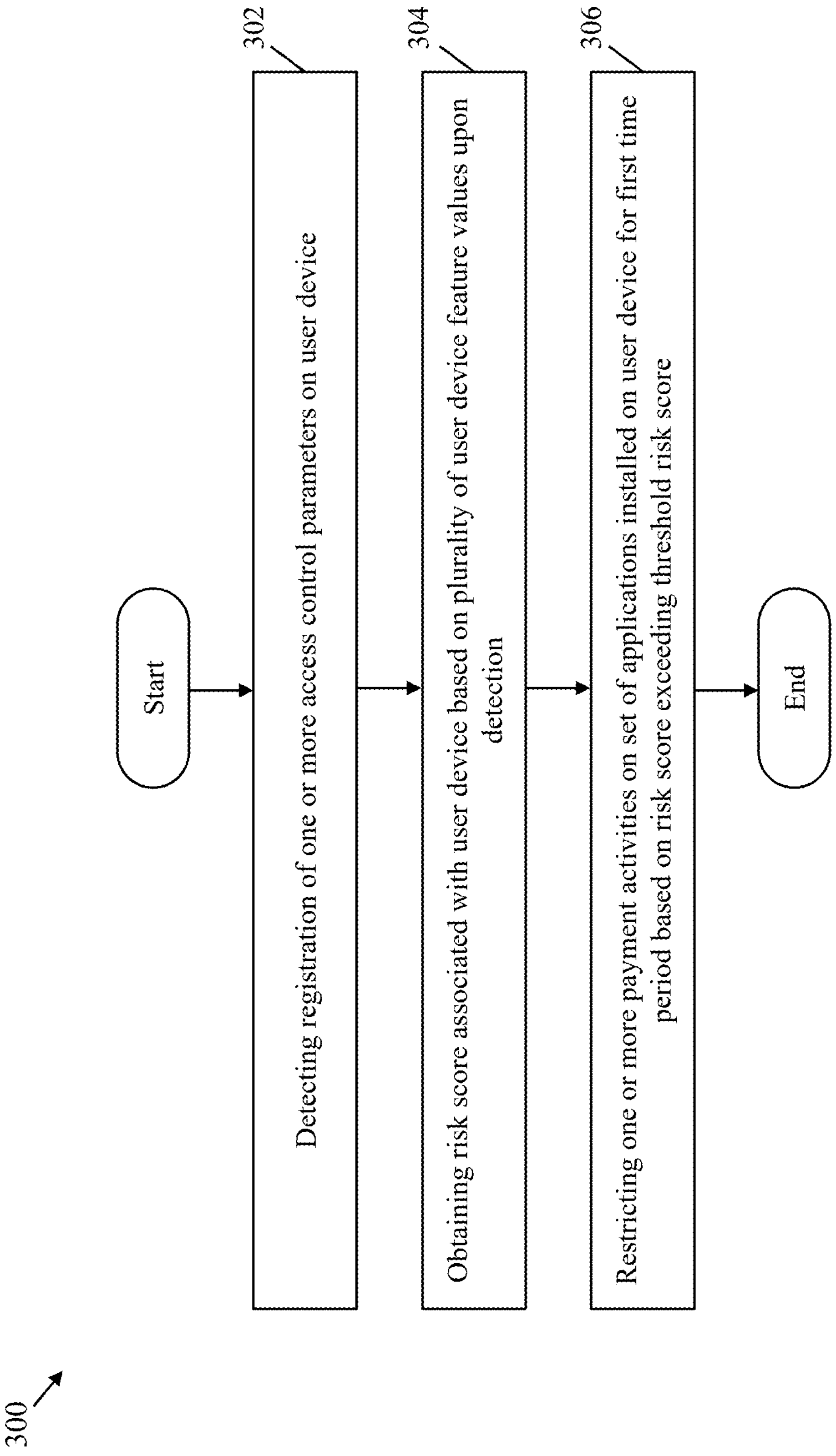
FIG. 3 represents a high-level flowchart that illustrates a method (e.g., a process) for facilitating fraud prevention in the user device of the system environment of FIG. 1, in accordance with an exemplary embodiment of the present disclosure.

FIG. 3 represents a high-level flowchart 300 that illustrates a method (e.g., a process 300) for facilitating fraud prevention in the user device 104, in accordance with an exemplary embodiment of the present disclosure.

At 302, the registration of the one or more access control parameters is detected on the user device 104 by the processing circuitry 112. The one or more access control parameters correspond to at least one of the fingerprint template, the iris template, the facial template, the personal identification number, and the passcode.

At 304, the risk score associated with the user device 104 is obtained by the processing circuitry 112 based on the plurality of user device feature values upon the detection of the registration of the one or more access control parameters. The risk score may be indicative of the probability of a potential takeover of the user device 104 by a fraudulent user.

At 306, the one or more payment activities on the set of applications installed on the user device 104 are restricted by the processing circuitry 112 based on the risk score exceeding the threshold risk score. The one or more payment activities are restricted for the first time period. Additionally, the one or more non-payment activities are accessible on the set of applications during the first time period.

Figure 4A:
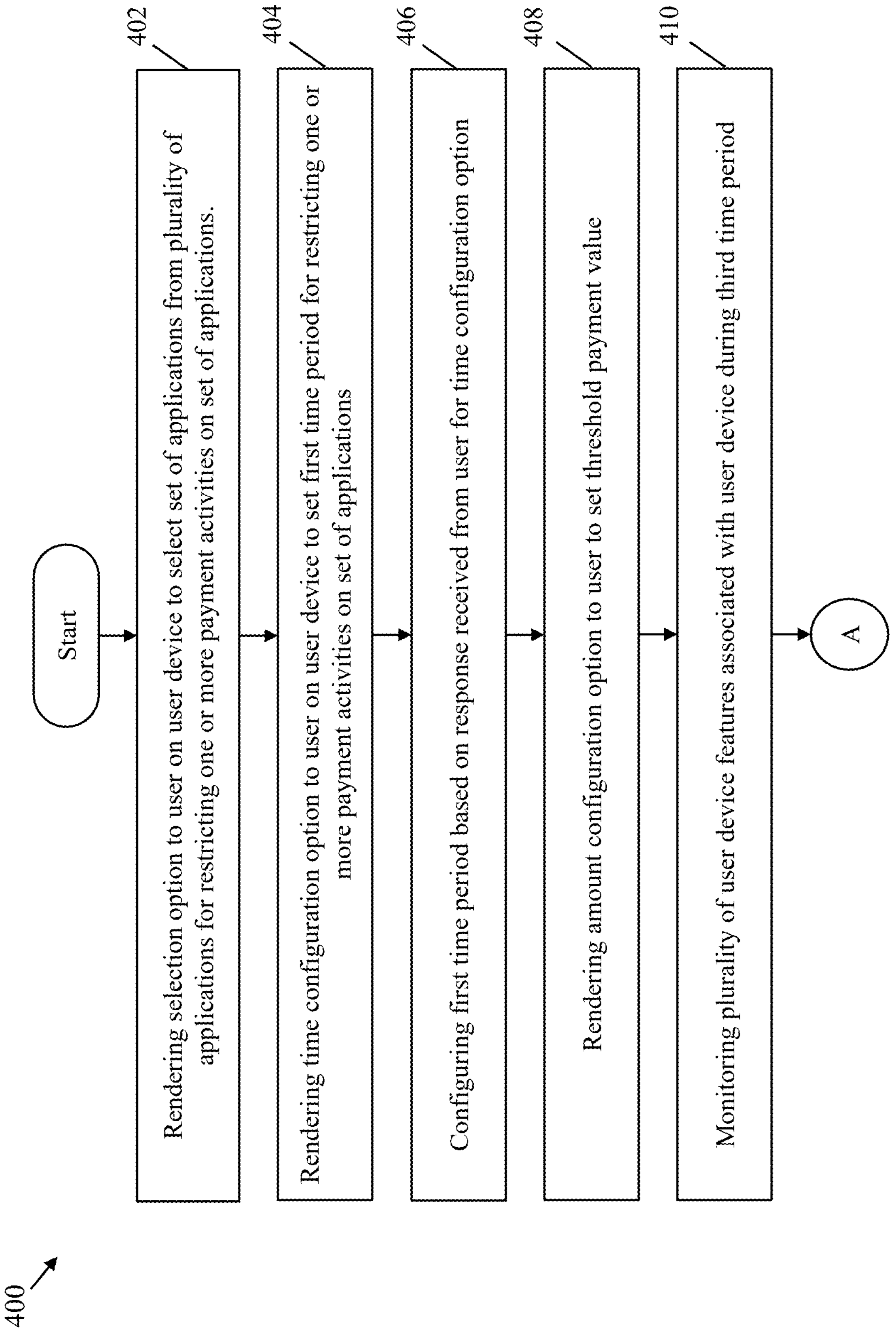
FIGS. 4A-4C, collectively, represent a flowchart that illustrates a method (e.g., a process) for facilitating fraud prevention in the user device of the system environment of FIG. 1, in accordance with an exemplary embodiment of the present disclosure.
Figure 4B:
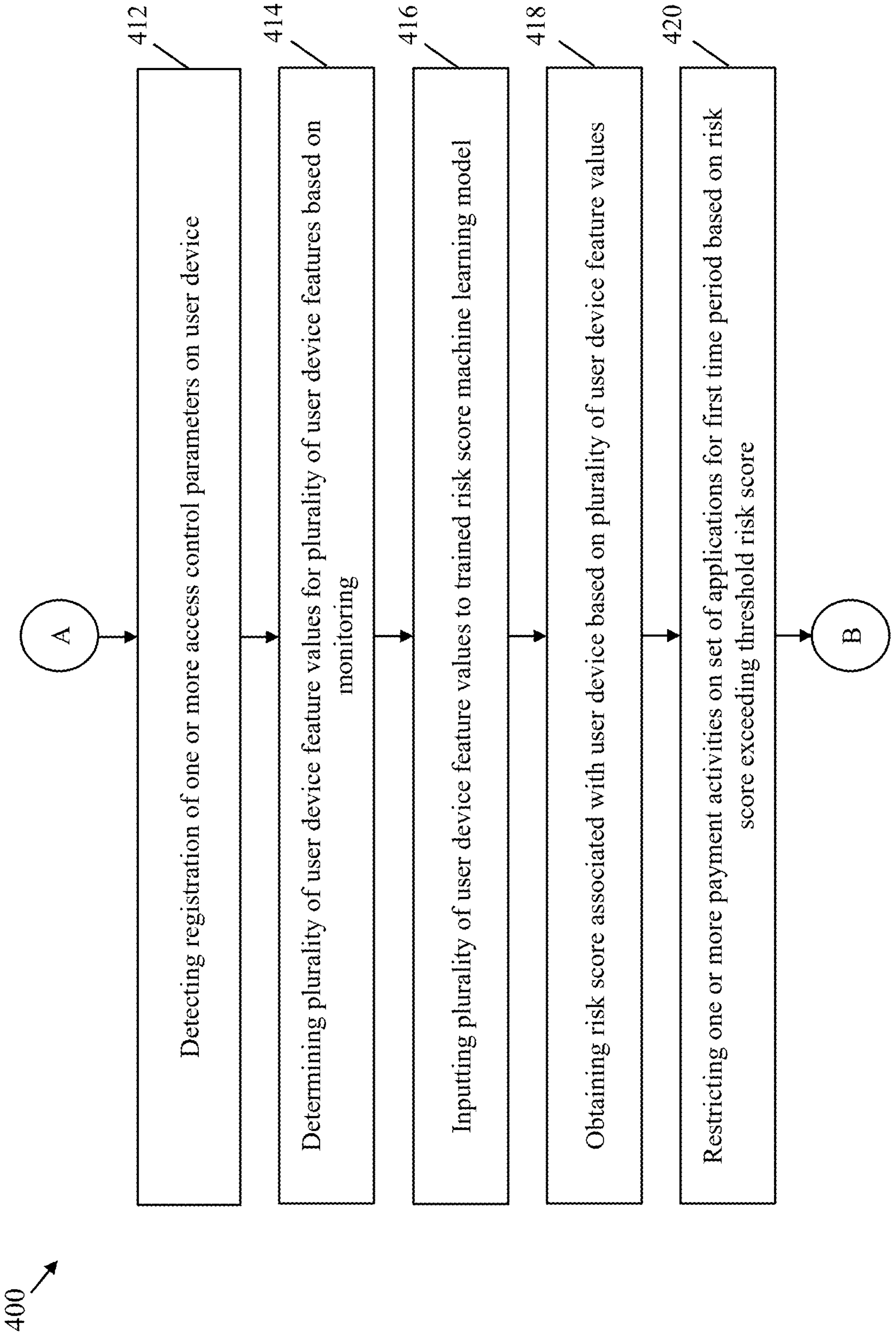
Figure 4C:
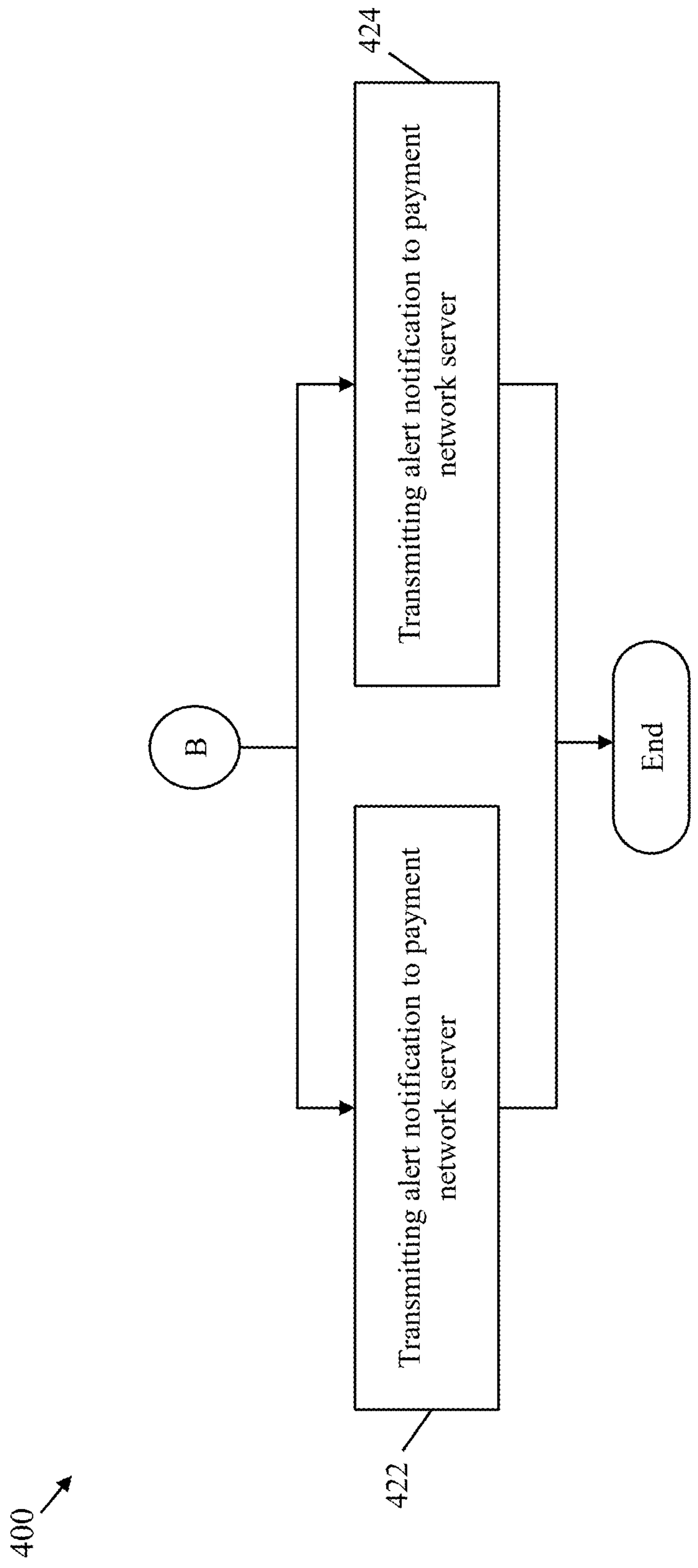

FIGS. 4A-4C, collectively, represent a flowchart 400 that illustrates a method (e.g., a process 400) for facilitating fraud prevention in the user device 104, in accordance with an exemplary embodiment of the present disclosure.

Referring to FIG. 4A, at 402, the selection option is rendered to the user 102 on the user device 104 by the processing circuitry 112. The selection option indicates the user 102 to select the set of applications from the plurality of applications 124 installed on the user device 104 for restricting the one or more payment activities on the set of applications.

At 404, the time configuration option is rendered to the user 102 on the user device 104 by the processing circuitry 112. The time configuration option indicates the user 102 to set the first time period for restricting the one or more payment activities on the set of applications selected by the user 102 in case of a potential takeover of the user device 104 by a fraudulent user. In an example, the first time period is one hour. In another example, the first time period is three hours. At 406, the first time period is configured by the processing circuitry 112 based on the response received from the user 102 for the time configuration option rendered to the user 102 on the user device 104.

At 408, the amount configuration option is rendered to the user 102 on the user device 104 by the processing circuitry 112. The amount configuration option indicates the user 102 to set the threshold payment value where the one or more payment transactions associated with the one or more payment amounts, performed by the way of the user device 104 are restricted for the second time period when the one or more payment amounts exceed the threshold payment value.

At 410, the plurality of user device features associated with the user device 104 are monitored by the processing circuitry 112. The plurality of user device features may include the plurality of non-invasive device features and the plurality of consent-based device features. The plurality of non-invasive device features may include the battery-level of the user device 104, the charging status of the user device 104, the usage statistics of the plurality of applications 124, the network connectivity of the user device 104, the orientation of the user device 104, or the like. The plurality of consent-based device features may include the location of the user device 104, the model number of the user device 104, the manufacturer of the user device 104, the unique device identifier of the user device 104, data transfer details (e.g., transfer of photos, documents, videos, and the like) of the user device 104, or the like.

Referring to FIG. 4B, at 412, the registration of one or more access control parameters is detected on the user device 104 by the processing circuitry 112. The one or more access control parameters correspond to at least one of the fingerprint template, the iris template, the facial template, the personal identification number, and the passcode.

At 414, the plurality of user device feature values for the plurality of user device features are determined by the processing circuitry 112 based on the monitoring of the plurality of user device features during the third time period upon the detection of the registration of the one or more access control parameters. In an example, the third time period may include two hours prior to the detection of the registration of the one or more access control parameters. In some additional embodiments, the third time period may include a time period prior to the detection of the registration of the one or more access control parameters on the user device 104 and a time period after the detection of the registration of the one or more access control parameters on the user device 104.

At 416, the plurality of user device feature values are provided as the input to the trained risk score machine learning model 126 by the processing circuitry 112. At 418 the risk score associated with the user device 104 is obtained by the processing circuitry 112. The risk score may be indicative of the probability of a potential takeover of the user device 104 by a fraudulent user.

At 420, the one or more payment activities on the set of applications are restricted by the processing circuitry 112 for the first time period based on the risk score exceeding the threshold risk score. Additionally, the one or more non-payment activities remain accessible on the set of applications during the first time period. As a result, fraudulent payment transactions on the user device 104 are prevented.

Referring to FIG. 4C, at 422, the alert notification is transmitted to the payment network server 106 by the processing circuitry 112. The alert notification indicates the payment network server 106 to restrict the one or more payment transactions associated with the user device 104 during the second time period when the one or more payment amounts associated with the one or more payment transactions exceed the threshold payment value.

At 424, the alert notification is transmitted to the issuer server 108 by the processing circuitry 112. The alert notification indicates the issuer server 108 to restrict the one or more payment transactions associated with the user device 104 during the second time period when the one or more payment amounts associated with the one or more payment transactions exceed the threshold payment value.

Figure 5:
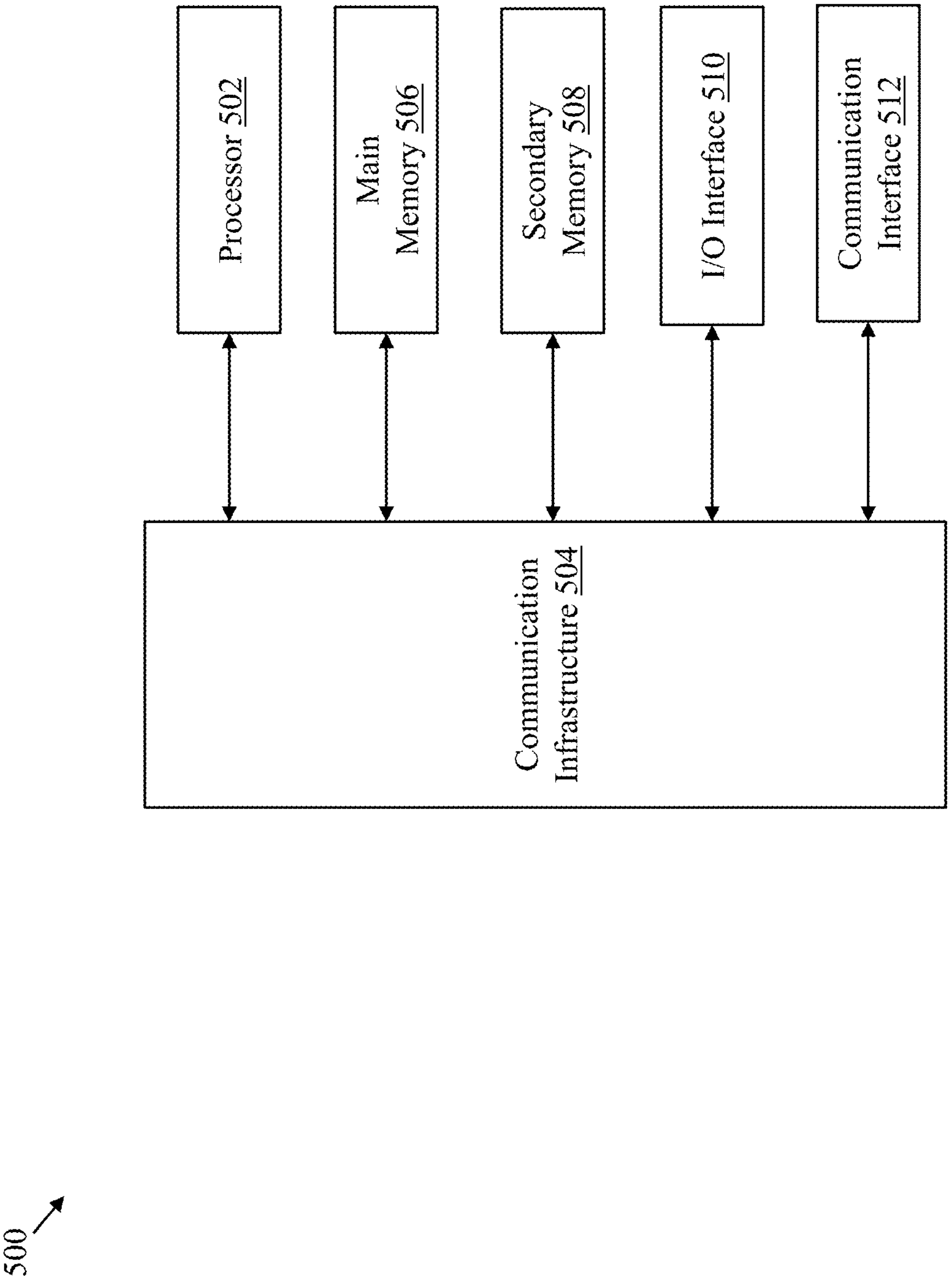
FIG. 5 is a block diagram that illustrates a system architecture of a computer system of the system environment of FIG. 1, in accordance with an exemplary embodiment of the present disclosure.

FIG. 5 is a block diagram that illustrates a system architecture of a computer system 500 of the system environment 100 of FIG. 1, in accordance with an exemplary embodiment of the present disclosure. An embodiment of disclosure, or portions thereof, may be implemented as computer-readable code on the computer system 500. In one example, the user device 104, the payment network server 106, and the issuer server 108 may be implemented as the computer system 500. Hardware, software, or any combination thereof may embody modules and components used to implement the methods of FIG. 3 and FIGS. 4A-4C. The computer system 500 may include a processor 502, a communication infrastructure 504, a main memory 506, a secondary memory 508, an input/output (I/O) interface 510, and a communication interface 512.

The processor 502 may be a special-purpose or a general-purpose processing device. The processor 502 may be a single processor, multiple processors, or combinations thereof. Further, the processor 502 may be connected to the communication infrastructure 504, such as a bus, message queue, multi-core message-passing scheme, and the like.

The main memory 506 may be configured to store instructions that facilitate various operations described in conjunction with FIG. 3, and FIGS. 4A-4C. Examples of the main memory 506 may include a random access memory (RAM), a read only memory (ROM), and the like. The secondary memory 508 may include a hard disk drive (HDD) or a removable storage drive, such as a floppy disk drive, a magnetic tape drive, a compact disc, an optical disk drive, a flash memory, and the like. In an embodiment, the removable storage drive may be a non-transitory computer-readable medium.

The I/O interface 510 includes various input and output devices that are configured to communicate with the processor 502. Examples of the input devices may include a keyboard, a mouse, a joystick, a touchscreen, a microphone, and the like. Examples of the output devices may include a display screen, a speaker, headphones, and the like. The communication interface 512 may be configured to allow data to be transferred between the computer system 500 and various devices that are communicatively coupled to the computer system 500. Examples of the communication interface 512 may include a modem, a network interface, i.e., an Ethernet card, a communication port, and the like. Data transferred via the communication interface 512 may correspond to signals, such as electronic, electromagnetic, optical, or other signals as will be apparent to a person skilled in the art.

Embodiments in the present disclosure provide the system environment 100 and the method for facilitating fraud prevention in the user device 104. The processing circuitry 112 restricts the one or more payment activities on the user device 104 when the user device 104 is potentially taken over by a fraudulent user. As a result, fraudulent payment transactions by way of the compromised user device 104 are prevented. Additionally, the processing circuitry 112 alerts the payment network server 106 or the issuer server 108 to restrict payment transactions that are associated with the user device 104, thereby providing two-factor protection in case of unauthorized takeover of the user device 104. Thus, the present disclosure provides security to the user device 104 against unauthorized takeover of the user device 104.

Techniques consistent with the present disclosure provide, among other features, systems and methods for facilitating fraud detection. While various exemplary embodiments of the disclosed system and method have been described above, it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope. While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

What is claimed is:

1. A method, comprising:

monitoring, by processing circuitry of a user device, a plurality of device features associated with the user device;

determining, by the processing circuitry, a plurality of device feature values for the plurality of device features based on the monitoring;

detecting, by the processing circuitry, registration of one or more access control parameters that authorize access to one or more operations on the user device; and performing fraud preventing actions in response to the detection of the registration of the one or more access control parameters on the user device, wherein the fraud preventing actions comprise:

obtaining, by the processing circuitry, a risk score associated with the user device, wherein the risk score is indicative of a probability of a takeover of the user device by a fraudster and is based on the plurality of device feature values determined from monitoring the plurality of device features during a monitoring period associated with the detecting; and restricting, by the processing circuitry, one or more payment activities on a set of applications installed on the user device for a bounded first time period based on the risk score exceeding a threshold risk score and withdrawing the restriction on the set of applications installed on the device thereafter.

2. The method of claim 1, wherein one or more non-payment activities remain accessible on the set of applications during the first time period.

3. The method of claim 1, further comprising:

rendering, by the processing circuitry, a time configuration option to a user of the user device to set the first time period for restricting the one or more payment activities on the set of applications; and configuring, by the processing circuitry, the first time period based on a response received from the user for the time configuration option.

4. The method of claim 1, further comprising rendering, by the processing circuitry, a selection option to a user on the user device to select the set of applications from a plurality of applications installed on the user device for restricting the one or more payment activities on the set of applications.

5. The method of claim 1, further comprising transmitting, by the processing circuitry, an alert notification to a payment network server indicating to restrict one or more payment transactions associated with the user device during a second time period when one or more payment amounts associated with the one or more payment transactions exceed a threshold payment value.

6. The method of claim 1, further comprising transmitting, by the processing circuitry, an alert notification to an issuer server indicating to restrict one or more payment transactions associated with the user device during a second time period when one or more payment amounts associated with the one or more payment transactions exceed a threshold payment value.

7. The method of claim 6, further comprising rendering, by the processing circuitry, an amount configuration option to a user of the user device to set the threshold payment value.

8. The method of claim 1, further comprising inputting, by the processing circuitry, a plurality of user device feature values to a trained risk score machine learning model, wherein the risk score is outputted by the trained risk score machine learning model based on the plurality of user device feature values.

9. The method of claim 1, wherein the one or more access control parameters correspond to at least one of a fingerprint template, an iris template, a facial template, a personal identification number, and a passcode.

10. A device comprising:

processing circuitry configured to:

monitor a plurality of device features associated with the device;

determine a plurality of device feature values for the plurality of device features based on the monitoring;

detect registration of one or more access control parameters that authorize access to one or more operations on the device; and perform fraud preventing actions in response to the detection of the registration of the one or more access control parameters on the user device, wherein the fraud preventing actions comprise:

obtaining a risk score associated with the device, wherein the risk score is indicative of a probability of a takeover of the device by a fraudster and is based on the plurality of device feature values determined from monitoring the plurality of device features during a monitoring period associated with the detecting; and restricting one or more payment activities on a set of applications installed on the device for a bounded first time period based on the risk score exceeding a threshold risk score and withdrawing the restriction on the set of applications installed on the device thereafter.

11. The device of claim 10, wherein one or more non-payment activities remain accessible on the set of applications during the first time period.

12. The device of claim 10, wherein the processing circuitry is further configured to:

render a time configuration option to a user of the device to set the first time period for restricting the one or more payment activities on the set of applications; and configure the first time period based on a response received from the user for the time configuration option.

13. The device of claim 10, wherein the processing circuitry is further configured to render a selection option to a user on the device to select the set of applications from a plurality of applications installed on the device for restricting the one or more payment activities on the set of applications.

14. The device of claim 10, wherein the processing circuitry is further configured to transmit an alert notification to a payment network server indicating to restrict one or more payment transactions associated with the device during a second time period when one or more payment amounts associated with the one or more payment transactions exceed a threshold payment value.

15. The device of claim 10, wherein the processing circuitry is further configured to transmit an alert notification to an issuer server indicating to restrict one or more payment transactions associated with the device during a second time period when one or more payment amounts associated with the one or more payment transactions exceed a threshold payment value.

16. The device of claim 15, wherein the processing circuitry is further configured to render an amount configuration option to a user of the device to set the threshold payment value.

17. The device of claim 10, further comprising a memory coupled to the processing circuitry and configured to store a trained risk score machine learning model, wherein the processing circuitry is further configured to input a plurality of device feature values to the trained risk score machine learning model, and wherein the risk score is outputted by the trained risk score machine learning model based on the plurality of device feature values.

18. The device of claim 10, wherein the one or more access control parameters correspond to at least one of a fingerprint template, an iris template, a facial template, a personal identification number, and a passcode.

* * * * *